April 28, 1925.

I. NACHUMSOHN 1,535,176

REMOTE CONTROL TYPEWRITING MECHANISM

Filed Aug. 12, 1922     8 Sheets-Sheet 1

INVENTOR
I. Nachumsohn

ATTORNEYS

April 28, 1925.

I. NACHUMSOHN 1,535,176

REMOTE CONTROL TYPEWRITING MECHANISM

Filed Aug. 12, 1922   8 Sheets-Sheet 2

INVENTOR
I. Nachumsohn
BY Munn & Co.
ATTORNEYS

April 28, 1925.

I. NACHUMSOHN 1,535,176

REMOTE CONTROL TYPEWRITING MECHANISM

Filed Aug. 12, 1922    8 Sheets-Sheet 3

INVENTOR
I. Nachumsohn
BY
ATTORNEYS

April 28, 1925.

I. NACHUMSOHN

REMOTE CONTROL TYPEWRITING MECHANISM

Filed Aug. 12, 1922

INVENTOR
I. Nachumsohn
BY
ATTORNEYS

April 28, 1925.

1,535,176

I. NACHUMSOHN

REMOTE CONTROL TYPEWRITING MECHANISM

Filed Aug. 12, 1922     8 Sheets-Sheet 5

INVENTOR
I. Nachumsohn
BY
ATTORNEYS

April 28, 1925. 1,535,176
I. NACHUMSOHN
REMOTE CONTROL TYPEWRITING MECHANISM
Filed Aug. 12, 1922 8 Sheets-Sheet 6
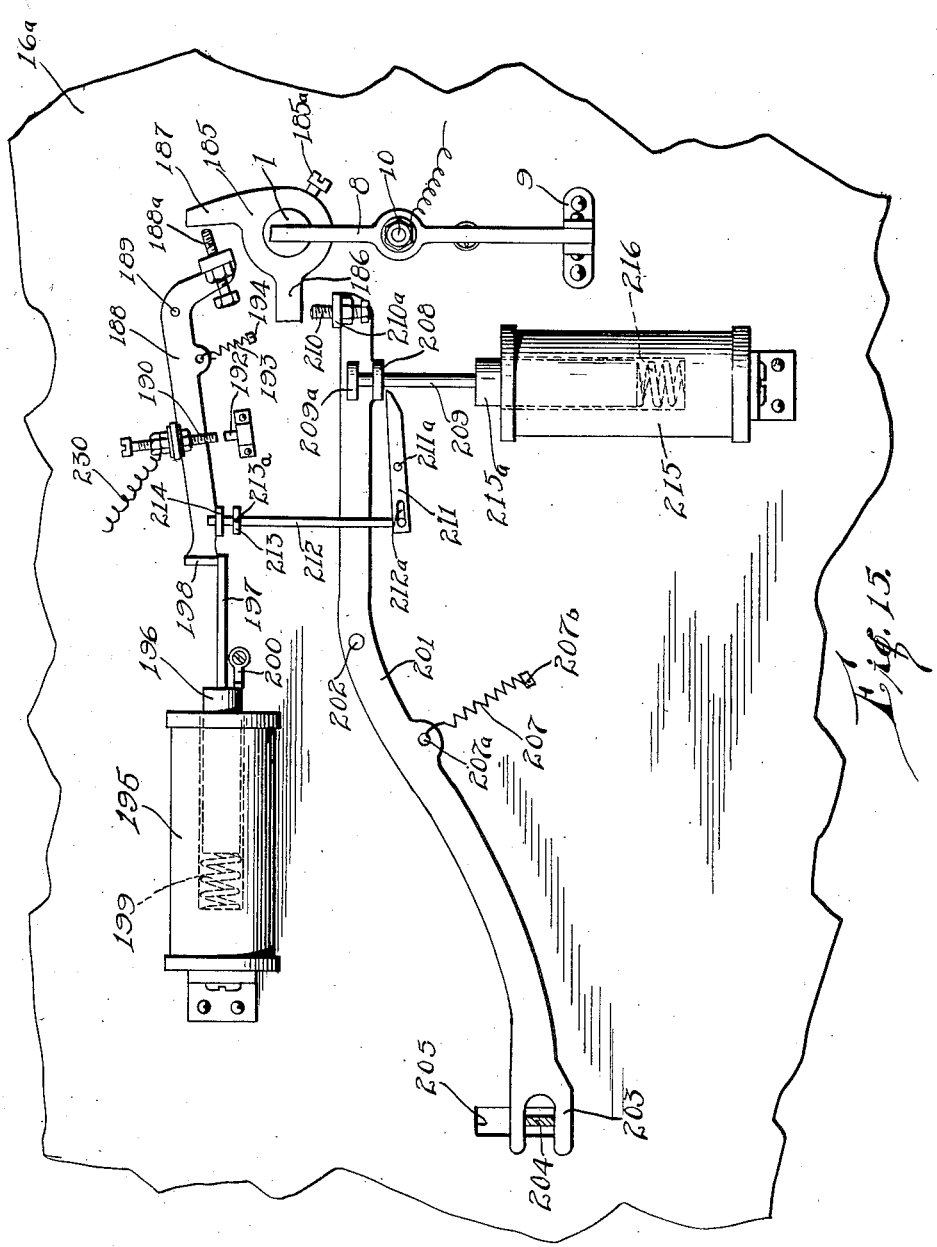
INVENTOR
I. Nachumsohn,
BY
ATTORNEYS April 28, 1925.
I. NACHUMSOHN
1,535,176
REMOTE CONTROL TYPEWRITING MECHANISM
Filed Aug. 12, 1922    8 Sheets-Sheet 7
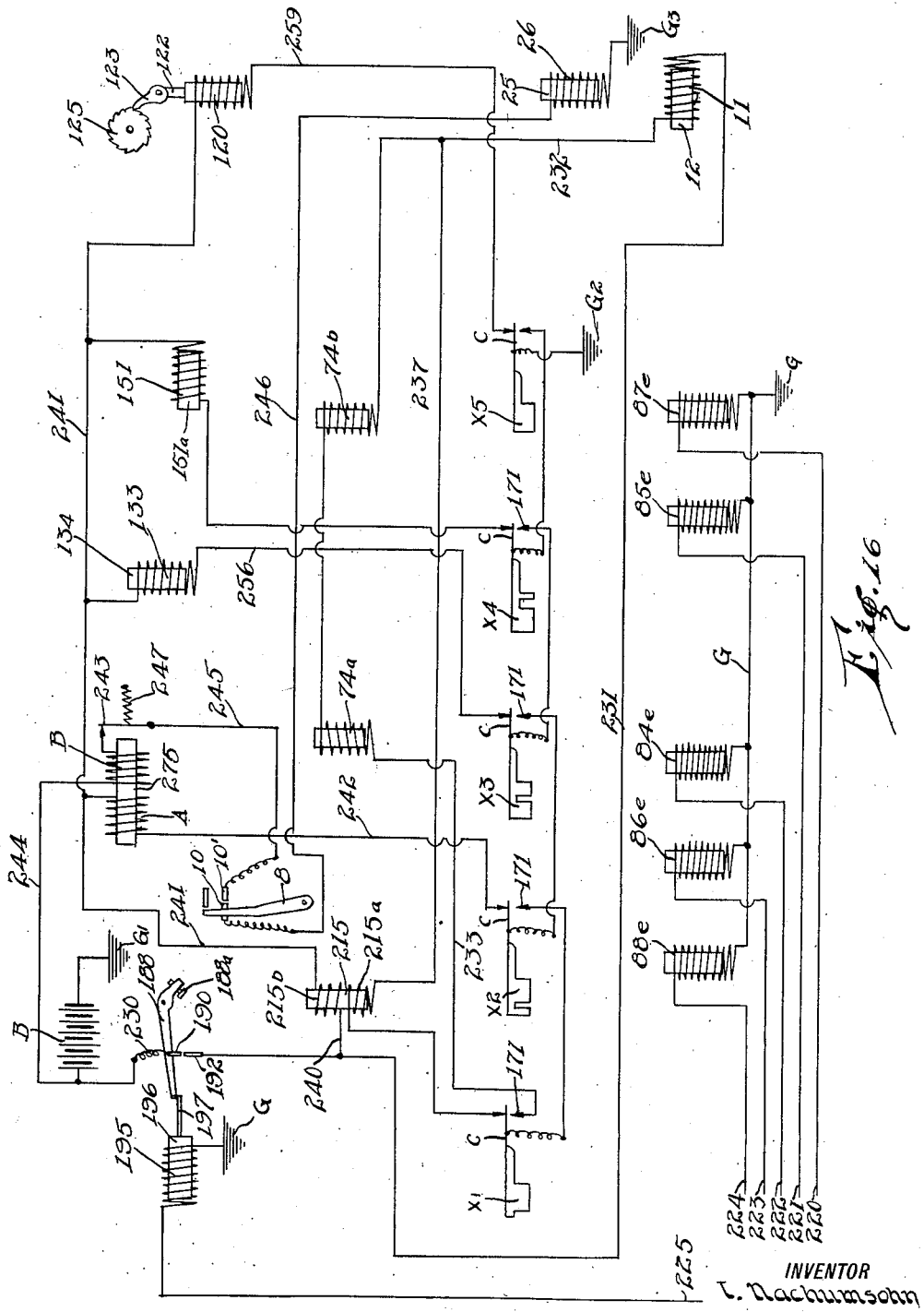
INVENTOR
I. Nachumsohn
BY
ATTORNEYS

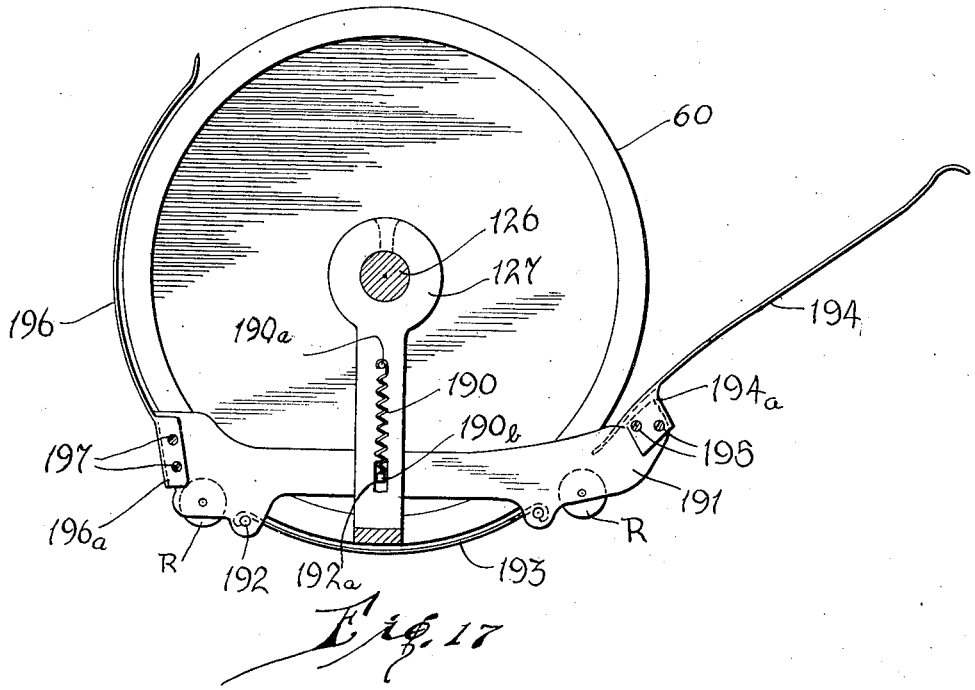
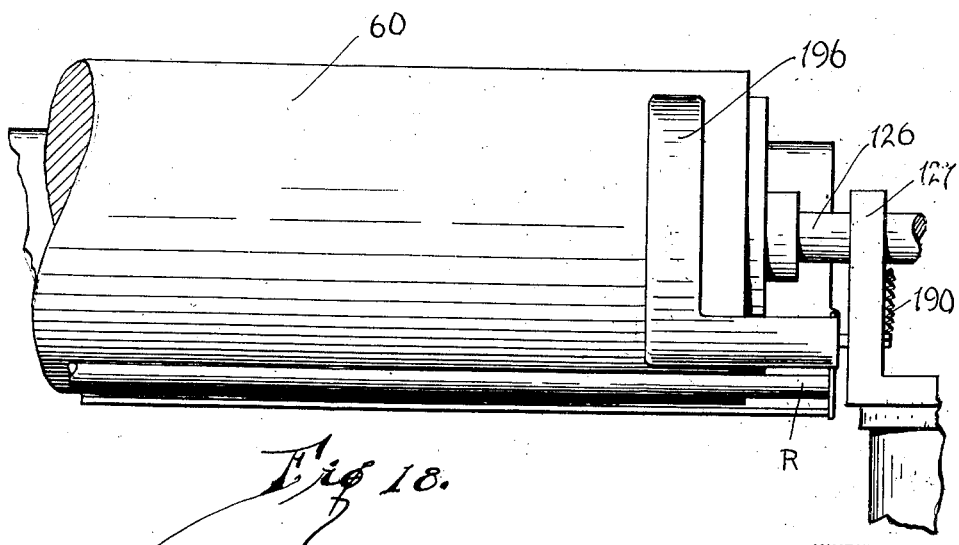

Patented Apr. 28, 1925.

1,535,176

UNITED STATES PATENT OFFICE.

IRVING NACHUMSOHN, OF WINNIPEG, MANITOBA, CANADA.

REMOTE-CONTROL TYPEWRITING MECHANISM.

Application filed August 12, 1922. Serial No. 581,519.

*To all whom it may concern:*

Be it known that I, IRVING NACHUMSOHN, a citizen of the United States, and a resident of Winnipeg, in the Province of Manitoba and Dominion of Canada, have invented a new and useful Improvements in Remote-Control Typewriting Mechanism, of which the following is a full, clear, and exact description.

My invention relates to improvements in remote controlled typewriting mechanisms, and it consists in the combinations, constructions, and arrangements herein described and claimed.

An object of my invention is to provide a device of the character described which is applicable to line telegraphy systems as well as wireless telegraphy systems, and which may be used as a locally controlled electric typewriter or printing device.

A further object of my invention is to provide a device of the character described by means of which messages transmitted by line or wireless telegraphy may be printed automatically at the receiver.

A further object of my invention is to provide a device of the character described which may be operated very rapidly and with extreme accuracy to reproduce a printed or typewritten message.

A further object of my invention is to provide a device of the character described which is relatively simple in construction, and which is thoroughly practical commercially.

Other objects and advantages will appear in the following specification, and the novel features of the invention will be particularly pointed out in the appended claims.

My invention is illustrated in the accompanying drawings, forming part of this application, in which—

Figure 1:
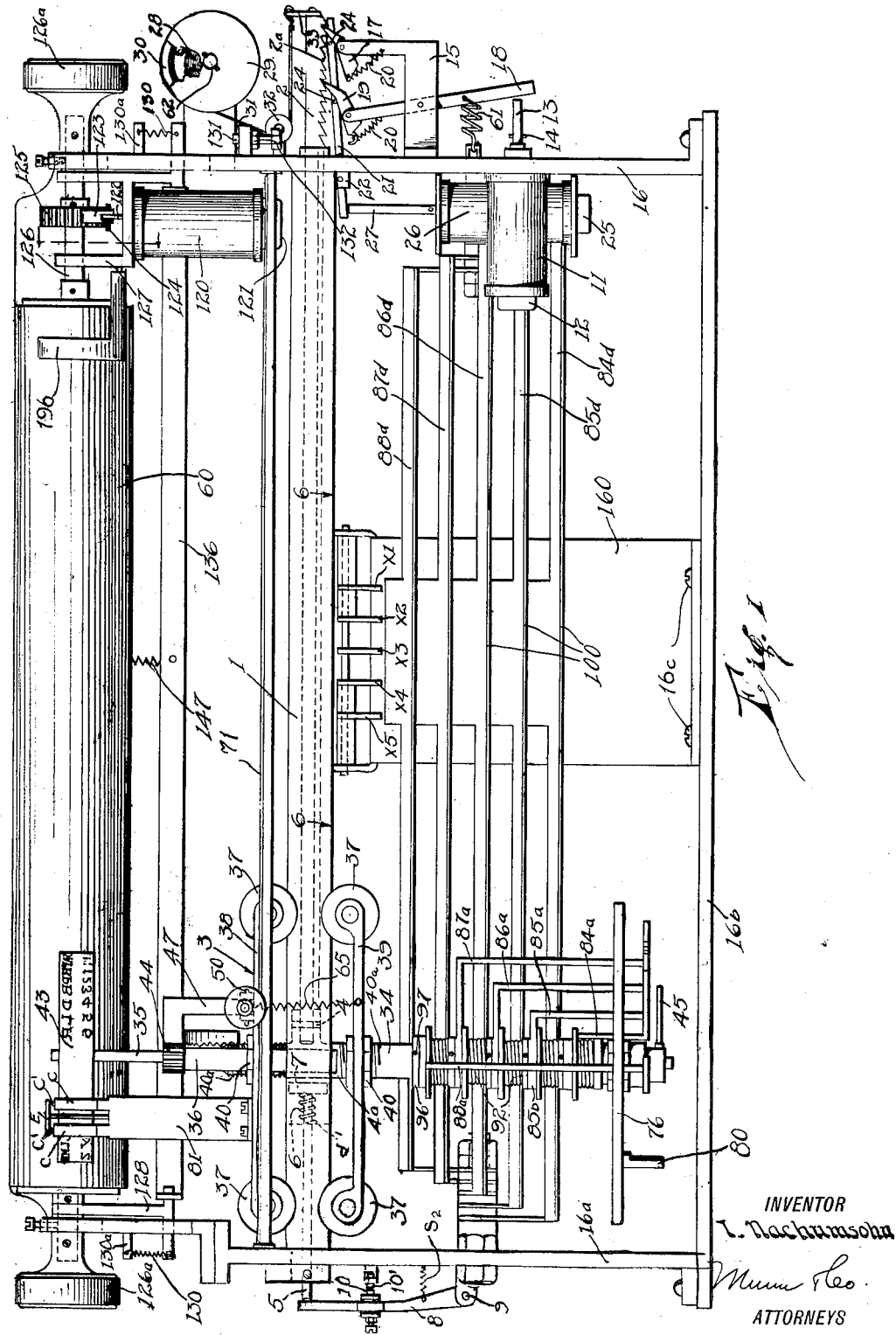
Figure 1 is a front elevation of an embodiment of my invention.
Figure 5:
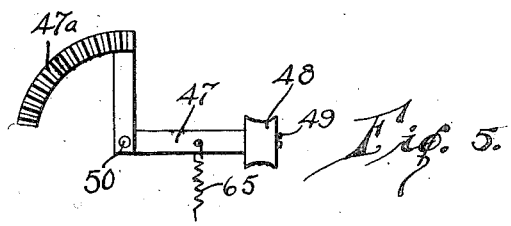
Figure 6:
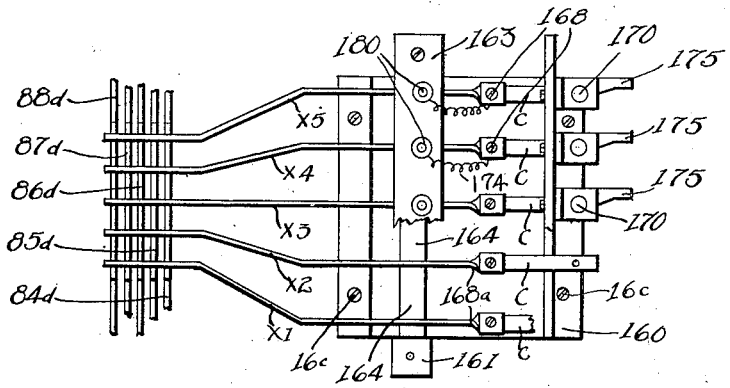
Figure 7:
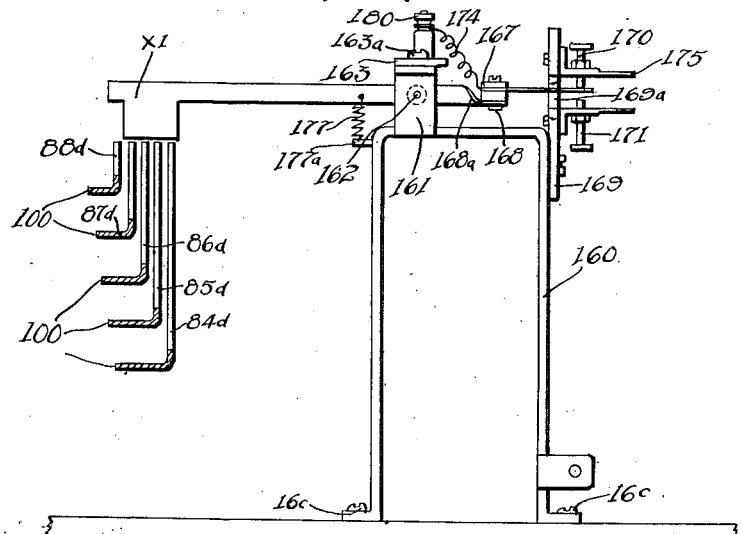
Figure 8:
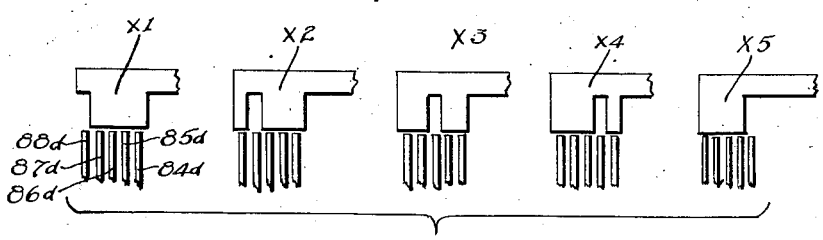
Figure 9:
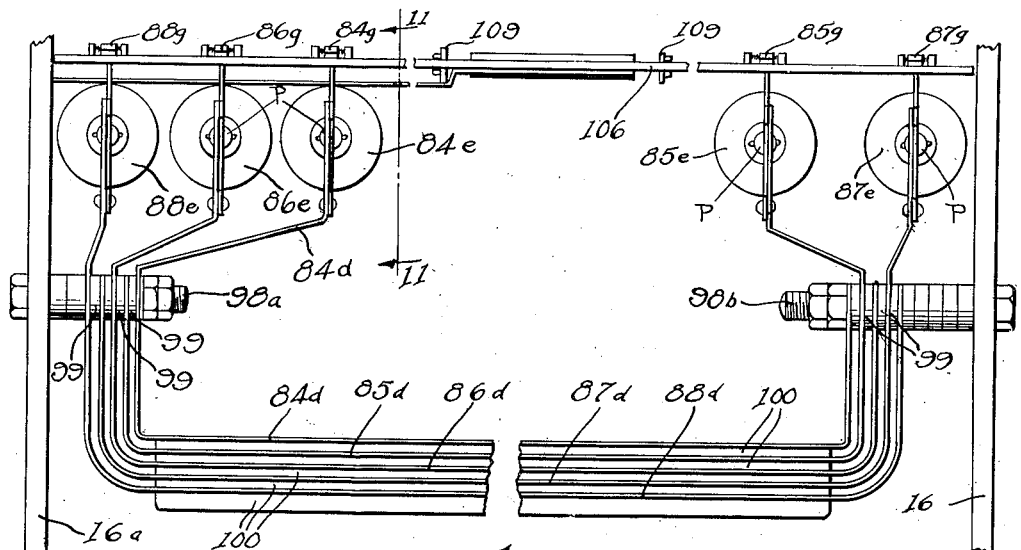
Figure 10:
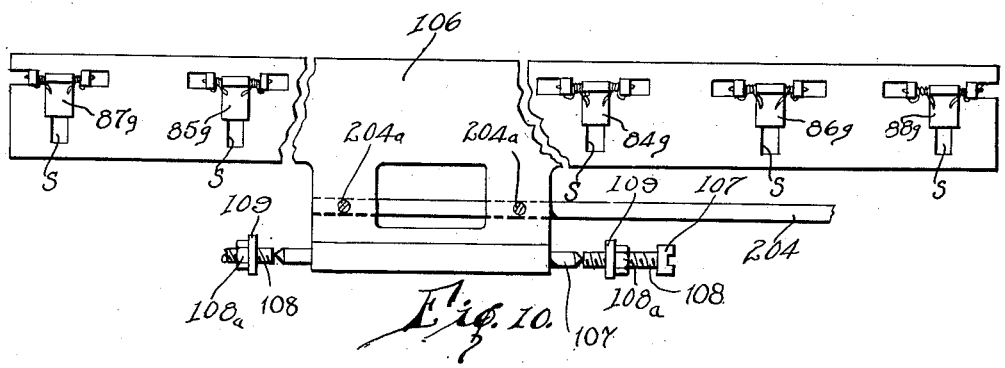
Figure 11:
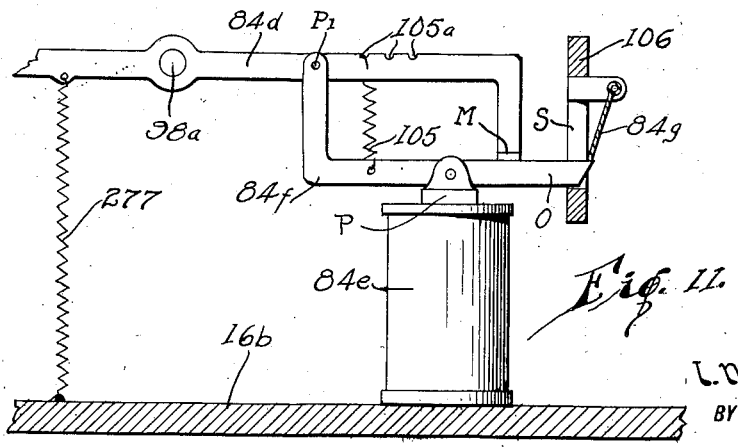
Figure 12:
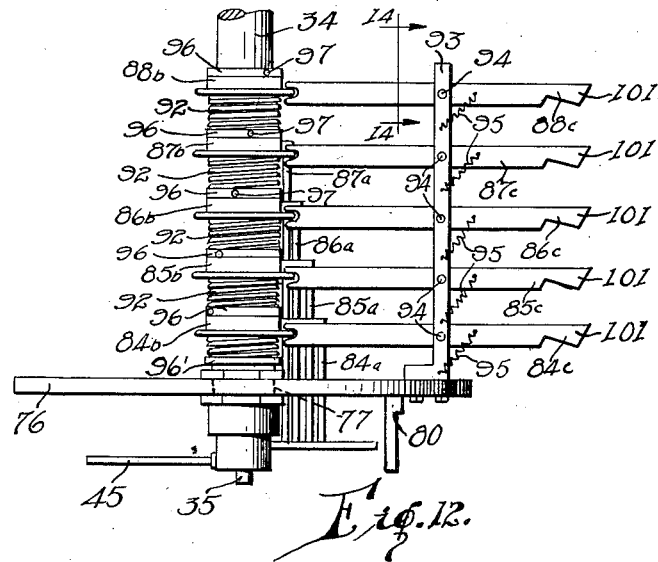
Figure 13:
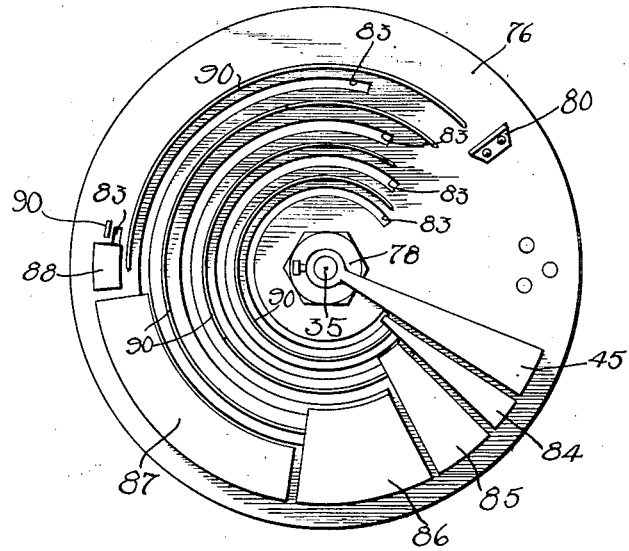
Figure 14:
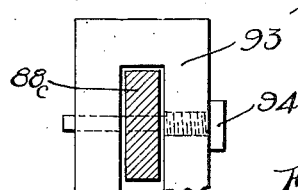

Figure 5 is a side elevation of a portion of the type-wheel operating mechanism, Figure 6 is a top plan view taken along the line 6—6 of Figure 1, Figure 7 is an end elevation of the mechanism illustrated in Figure 6, Figure 8 is a fragmentary view of the selector levers, Figure 9 is a top plan view of a portion of the mechanism illustrated in Figure 1, Figure 10 is an enlarged rear elevation of a portion of the mechanism shown in Figure 9, Figure 11 is a sectional view along the line 11—11 of Figure 9, Figure 12 is a fragmentary view of a portion of the type-wheel operating mechanism, Figure 13 is a bottom plan view of the mechanism illustrated in Figure 12, Figure 14 is a sectional view along the line 14—14 of Figure 12, Figure 15 is a fragmentary side elevation of the mechanism illustrated in Figure 1, Figure 16 is a diagrammatic showing of the electrical connections embodied in my invention, Figure 17 is an enlarged end elevation of the platen, and Figure 18 is an enlarged partial front elevation of the platen.

In carrying out my invention, I employ a mechanism somewhat similar to the typewriter having a type-wheel and a carriage, and means for operating the type-wheel, means for shifting and rotating the platen, and a means for operating the carriage.

Figure 4:
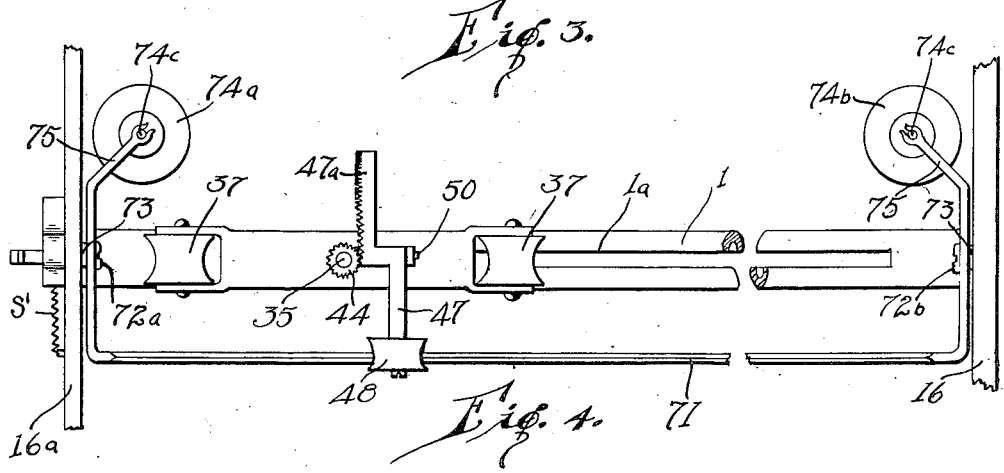
Figure 4 is a top plan view of the type-wheel carriage.

In Figure 1 I have shown the general arrangement of parts in a front elevation of the device. A slotted beam 1 is rotatably mounted upon the supporting sides 16 and 16$^a$ of the frame 16$^b$ of the device. The beam 1 is provided with a longitudinal slot 1$^a$ therethrough, as is more clearly shown in Figure 4. This slot extends to within a short distance of the ends of the beam. A ratchet bar 2, having teeth 2$^a$, is slidably mounted within the beam 1 so that the toothed portion 2$^a$ faces downwardly. This ratchet bar serves as a means for moving the carriage of the device which will be hereinafter described. One end of the ratchet bar is attached by means of a screw 4 to a portion 4$^a$ of the carriage. From the left extremity $d'$ of the slot 1$^a$ to the left end of the beam 1 is a hole longitudinally disposed through the beam in which a bumper rod 5 is slidably mounted. The bumper rod 5 is provided with an enlarged head portion 7 disposed within the slot 1ᵃ. This head 7 is arranged to receive an impulse from the carriage 3 when the carriage has traveled to the left of the beam 1 and is ready for the return movement. A compression spring 6 is disposed between the head 7 and the adjacent wall $d'$ of the slot 1ᵃ. This spring serves as a means for absorbing the shock or jar when the carriage contacts with the head 7. An arm 8 is pivotally mounted at 9 to the side 16ᵃ of the frame 16ᵇ. This arm is arranged so that its upper end is in direct alinement with the bumper rod 5. A pair of contacts 10 and 10' are carried by the arm 8 and the side member 16ᵃ, respectively, both contacts being insulated from their respective supporting surfaces 8 and 16ᵃ. A spring S² is provided for normally keeping the contacts 10—10' together. It is therefore evident that when the carriage 3 approaches and contacts the head portion 7, the bumper rod will be moved longitudinally to cause the separation of the contacts 10 and 10'.

Means for causing the movement of the carriage 3 progressively to the right, as in the writing of a message, is provided in a solenoid coil 11 having a plunger 12. A plunger rod 13 is carried by the plunger 12 and is provided with a pin 14 transversely disposed therethrough. This pin 14 serves as a stop pin, i. e., as a means for limiting the inward movement of the rod 13 to prevent the plunger 12 from falling out of the solenoid coil 11. In several other portions of my device I employ similar pins, such as shown at 14, for the same purpose, and further description of this particular structure is therefore thought to be unnecessary.

An arm 15 is rigidly attached to the side 16 adjacent the extended end of the ratchet rod 2. The arm 15 has supported thereon a pawl 17 and a lever 18, both pivotally mounted relative to the arm 15. The upper end of the lever 18 is provided with a pivotally mounted pawl 19. Both of these pawls are normally held in engagement with the ratchet teeth 2ᵃ by means of tension springs 20. A pivotally mounted release lever 21 is supported upon lugs 22 integral with the side portion 16. The lever 21 is arranged to extend through an opening in the side portion 16, and is provided with a pair of pins 24 at spaced intervals thereon and disposed in perpendicular relation thereto. The pins 24 are arranged to engage the pawls 17 and 19 to release the pawls from engagement with the teeth 2ᵃ when the lever 21 is actuated.

A solenoid coil 26, having a plunger 25 and a plunger rod 27, is supported upon the side portion 16, as shown in Figure 1. The plunger rod 27 is arranged to engage the lever 21 and actuate the lever when the coil 26 is energized, thus releasing the pawls 17 and 19 from engagement with the ratchet rod.

From the foregoing description it will be seen that when the solenoid coil 11 is energized, a tension spring 61 will stretch as the lever 18 operates, and the pawl 19 will move one space to the left and engage the adjacent tooth. The pawl 17 at this time is engaged by another tooth of the ratchet bar and the bar is held against movement to the left. The instant the solenoid coil 11 is dead, the spring 61 will draw the lever 18 toward the side member 16, and the ratchet bar 2 will be shifted one space to the right, carrying with it the carriage 3. This operation may be continued to cause the progressive movement of the carriage 3 toward the right of the beam 1.

Means for returning the carriage 3 to the left end of the beam 1, as in the beginning of a new line, is provided in a spring 28, one end of which is attached to a stationary lug 62, and the opposite end to a drum 29 rotatably mounted about the lug 62. On the periphery of the drum 29 is a groove 30 in which a cat-gut cord 31 is disposed. The cord 31 is secured at one end to the drum 29, and at its opposite end to a plate 33 secured to the ratchet rod 2. An idler pulley 32 is supported upon the side portion 16 of the device, and serves as a means for guiding the cord 31 in its travel from the drum 29 to the plate 33.

A type-wheel and its associate mechanism is mounted upon the carriage 3 in the following manner. A hollow vertical shaft 34 is provided with a flattened portion intermediate its length. This portion is adapted to pass through the slot 1ᵃ in the beam 1, the opposite ends of the shaft 34 being adapted to extend on either side of the beam 1. A spindle 35 is rotatably mounted in the shaft 34, as shown in Figure 1. A pair of frame members 38 and 39, forming a part of the carriage 3, is held in fixed position relative to the shaft 34 by means of nuts 40 which are adapted to engage a threaded portion 40ᵃ on the shaft 34. The frame members 38 and 39 serve as a supporting means for rotatably mounted wheels 37 which are arranged to engage opposite sides of the beam 1. It will be evident that movement of the carriage 3 along the beam 1 will cause the shaft 34 to move through the slot 1ᵃ with the carriage 3.

A type-wheel 43 is securely mounted upon the upper end of the shaft 35 so that rotation of the shaft 35 will cause the type-wheel 43 to rotate therewith. A small gear 44 is carried upon the shaft 35 intermediate the type-wheel 43 and the frame portion 38 of the carriage 3.

It should be explained here that in order to print a legible message, the type-wheel 43 must be caused to rotate and strike the paper upon the platen. I therefore have devised a means for selectively obtaining the different degrees of rotation of the type-wheel, and also for the movement of the type-wheel 43 toward the paper, which of course is occasioned by the movement of the entire beam 1 relative to the side members 16 and 16ª.

In Figure 5 I have shown an angular arm 47, one end of which forms an arcuate segmental gear 47ª, commonly called a mutilated gear. A wheel 48 is rotatably mounted upon the opposite end of the member 47 by means of a screw 49. The wheel 48 is provided with an arcuate groove in its periphery, the purpose of which will be hereinafter described. The arm 47 is pivotally mounted at 50 to an upstanding portion of the frame member 38 of the carriage 3 so that the gear portion 47ª is in mesh with the gear 44, and when the arm 47 is moved, the type-wheel 43 will rotate. A spring 65 serves as a means for normally holding the arm 47 at one end of its oscillatory path relative to the gear 44.

In order to effect the rotation, as well as the forward striking of the type against the platen 60, I provide a longitudinal bar 71 pivoted at 72ª and 72ᵇ to the side portions 16ª and 16, respectively. I employ washers 73 between the laterally bent portions of the rod 71 and the side members to reduce the friction to a minimum. The pivotal point 50 and the pivotal points 72ª and 72ᵇ are co-axial during the normal lateral movement of the carriage 3, and the wheel 48 is at all times in contact with the bar 71. Means for occasioning the movement of the bar 71, and thus the operation of the arm 47, is provided in a pair of solenoid coils 74ª and 74ᵇ having plungers 74ᶜ as similar to the plungers previously described. The plungers 74ᶜ are connected to portions 75 of the bar 71 so that when the solenoid coils are energized, the bar 71 will move and occasion the rotation of the type-wheel. It should be noted at this time that if the type wheel is limited in its rotation, or when a gear portion 47ª has moved to the end of its path relative to the gear 44, that further movement of the bar 71 will occasion the entire beam 1 to swing and cause the type-wheel to move toward the platen 60. The spring 65 tends to yieldingly oppose the rotation of the type wheel 43, and the spring $S^1$ tends to prevent the swinging of the beam, and hence the type toward the platen.

In Figures 12 and 13 I have shown a plate 76 having a central hole 77 therethrough which is arranged to receive the lower extremity of the shaft 34 (see Figure 1). The plate 76 is fixed against movement upon the shaft 34 by means of nuts 78. A stop member 80 is securely fixed to the plate 76 and is arranged to extend downwardly therefrom. An arm 45, having the shape of the segmental portion of a disc, is securely fixed to the lower end of the spindle 35. The arm 45 extends through a point relatively close to the periphery of the plate 76.

The means for revolving the type-wheel 43 has been explained, and also the action of the arm 45 when the limit of rotation of the type-wheel 43 has been reached, i. e., the movement of the carriage 3 and the beam 1 to occasion the type-wheel 43 to bridge and contact the platen 60 or paper placed therebetween. I employ the following means for limiting the movement of the shaft 35. In Figure 13 I have shown five concentric slots 83 in the plate 76. Also five narrow raised track portions 90 immediately adjacent and concentric the slots 83. Five other arms 84, 85, 86, 87, and 88 are provided and form integral angular extensions of a portion of the mechanism hereinafter described. The arms 84 to 88 inclusive are all normally disposed in a single plane, that plane being out of the normal plane of rotation of the arm 45. By selectively interposing any combination of arms 84 to 88 inclusive into the plane of rotation of the arm 45, the arm 45 will carry these other arms or interposing members, as I choose to call them, against the stop 80. Thus it is possible to obtain different positions relative to the plate 76 where the arm 45 will cease in its rotation, and the rotation of the spindle 35 will stop. In my present invention, I have the arm 85 twice the width of the arm 84; 86 four times the width of 84; 87 eight times the width of 84; and the distance between 88 and the stop 80 sixteen times the width of 84.

The member 88, unlike the other interposing members 84 to 87 inclusive, is not free to be moved by the arm 45 against the stop 80 along the path of the slots 83, but instead, I construct the interposing member 88 about the same width as the member 85 and limit the distance through which it may travel, i. e., its associate slot 83. Therefore, the limit of movement of the member 88 is its associate slot 83 alone, and not the stop member 80.

With reference to Figures 1 and 12 it will be noted that the shaft 34 is provided with a plurality of shiftable collars 84ᵇ to 88ᵇ, inclusive. These collars are connected directly by means of members 84ª to 88ª inclusive to the arms or interposing members 84 to 88, respectively. The members 84ª to 88ª are shown in part in Figure 12. This movement of the collars will occasion the movement of the arms 84 to 88, dependent upon which of the collars 84ᵇ to 88ᵇ is actuated. Coil springs 92, having one end secured to the collars and the opposite ends secured to the shaft 34, serve as a means for keeping the arms 84 to 88 inclusive at one end of their respective slot, as shown in Figure 13. The springs 92 are torsional springs. The collars when actuated do not move to the extent of affecting the torsional action of the springs 92.

Means for shifting the collars 84$^b$ to 88$^b$ inclusive, is provided in a U-shaped arm 93, which arm is securely fixed to the upper wall of the plate 76, adjacent the rear edge of the plate, i. e., that edge facing the body of the machine. Five levers 84$^c$ to 88$^c$ inclusive are pivotally mounted upon the U-shaped arms 93 by means of pivot screws 94 (see Figure 14). The levers 84$^c$ to 88$^c$ inclusive are arranged so that each is in registration with its collar 84$^b$ to 88$^b$ inclusive, i. e., the lever 84$^c$ is mounted so that it engages the collar 84$^b$. The engagement of these members is brought about by the provision of a notch at the end of the levers 84$^c$ to 88$^c$, which notch is arranged to receive a radially extending flange forming an integral part of the collars 84$^b$ to 88$^b$ inclusive.

Each of the levers 84$^c$ to 88$^c$ is provided with a tension spring 95 by means of which the collars 84$^b$ to 88$^b$ are normally held in elevated position relative to the plate 76. The collars, as has been related, are slidably mounted upon the shaft 34 so that a movement of the levers 84$^c$ to 88$^c$ will occasion the downward movement of their associate collars. Means for limiting the upward movement of the collars 84$^b$ to 88$^b$ is provided in stationary collars 96 which are secured against movement on the shaft 34 by means of set screws 97. To retain the lowermost of the torsional springs 92, I provide a collar 96', similar to the collars 96, fixed against movement upon the shaft 34. In order to bring about the selective shifting or downward movement into the plane of rotation of the arm 45 of the interposing members, I provide five bars 84$^d$ to 88$^d$ inclusive, one bar for each of the levers 84$^c$ to 88$^c$. The particular structure of these bars may be most clearly seen in Figures 1 and 9. These bars are substantially U-shaped and are arranged so that 84$^d$ is the innermost of the bars, and 88$^d$ is the outermost bar, the bars being arranged concentric to one another, as shown in the plan view in Figure 9. The opposite leg portions of the U-shaped bars 84$^d$ to 88$^d$ are pivotally mounted upon the side walls 16$^a$ and 16, by means of stub shafts 98$^a$ and 98$^b$, carried by the walls 16$^a$ and 16, respectively. A plurality of washers 99 are disposed one between each of the bars 84$^d$ to 88$^d$ so that the bars may not contact one another while in motion.

Each of the bars 84$^d$ to 88$^d$ is provided with a horizontal integral portion 100, which I choose to call horizontal lips (see Figure 7). The lips 100 are arranged to engage the outer portions 101 of the levers 84$^c$ to 88$^c$ inclusive, so that movement of any one of the bars 84$^d$ to 88$^d$ will occasion movement of its corresponding and associate lever 84$^c$ to 88$^c$. By employing such structure as the lips 100 and the levers 84$^c$ to 88$^c$, it is possible to attain the movement of any of the interposing members 84 to 88, regardless of the position of the carriage 3 on the beam 1.

Means for shifting or operating the bars 84$^d$ to 88$^d$ to occasion a movement of the interposing members 84 to 88 is provided in five solenoid coils 84$^e$ to 88$^e$ inclusive, one coil for each of the bars 84$^d$ to 88$^d$. In place of the solenoid plunger construction, I have heretofore described, the solenoid coils 84$^e$ to 88$^e$ are provided with somewhat different plunger mechanism. This mechanism may be briefly described as follows: In Figure 11 I have shown one of the coils 84$^e$. It will be noted that this coil is mounted in a vertical position and is provided with a plunger P. The plunger is pivotally connected to an L-shaped lever 84$^f$ intermediate the length of one of the legs thereof. The outer end of the opposite leg of the lever 84$^f$ is pivotally mounted at P' on a laterally bent portion of the bar 84$^d$ (see Figure 9). The extremity of this bar 84$^d$, as is the case of all of the bars 84$^d$ to 88$^d$ inclusive, is bent downwardly as shown at M so as to closely approach the outer extremity O of the lever 84$^f$. In like manner, each of the solenoid coils 84$^e$ to 88$^e$ is provided with a plunger P and associate levers 84$^f$ to 88$^f$, respectively. A spring 105 is provided and secured at one end to each of the levers 84$^f$ to 88$^f$, and arranged to engage one of a plurality of notches 105$^a$ in the upper surface of the bars 84$^d$ to 88$^d$, respectively.

Means for locking the levers 84$^c$ to 88$^c$ against release when actuated by the solenoid coils 84$^e$ to 88$^e$ inclusive, is provided in a plate 106 (see Figure 10). The plate 106 is bent at its lower end around a pivot pin 107. The pin 107 is rotatably supported between two screws 108 secured upon the base 16$^b$ of the device by means of bracket extensions 109. Lock nuts 108$^a$ permit making adjustments of the screws 108. A slot is provided through the plate 106 immediately behind each of the pawls or latches 84$^g$ to 88$^g$ inclusive. These slots are indicated at S in Figure 10, through which the ends of the levers 84$^f$ to 88$^f$ may protrude.

Normally, the ends of the levers 84$^f$ to 88$^f$ (see Figure 11) are disposed adjacent the top of their respective slots S in the plate 106. However, when any of the solenoid coils, such as the coil 84$^e$, is operated for a very short interval, the lever 84$^f$ will be pulled down in its slot S and the portion O will press the pawl 84$^g$ rearwardly and pass thereunder. The latch 84$^g$ will then return to its normal position by virtue of the spring provided therefor, and the lever 84$^f$ will be locked in the position shown in Figure 11, the spring 105 serving as a means for holding the bar 84$^d$ downwardly at its rear portion and upwardly at its forward portion, i. e., that portion having the lips 100. Obviously, when the plate 106 is pivoted rearwardly upon the pivot pin 107, the latch 84$^g$ will move out of engagement with the lever 84$^f$, and if the coil 84$^e$ is not energized, the bar 84$^d$ is free to return to its normal position. The springs 277, one of which is associated with each of the bars 84$^d$ to 88$^d$ inclusive, serve as a means for normally maintaining the bars 84$^d$ to 88$^d$ in normal position.

A tension spring S' is connected at one end to the end of the beam 1, and at its opposite end to the side portion 16$^a$. The purpose of this spring is to normally hold the beam 1 in the position shown in Figures 1 and 4, i. e., with the type wheel 43 away from the platen, hereinafter described. The spring S' is heavier and stronger than the spring 65, as shown in Figure 5, so that it is obvious that when the solenoid coils 74$^a$ and 74$^b$ become energized, that the type-wheel will revolve before there is any tendency of the beam 1 to rotate or turn upon its pivotal support on the side portions 16 and 16$^a$. The type-wheel, during the rotation thereof, is kept approximately one inch from the platen 60.

Let us assume that the bar 84 is shifted and locked by means of its associate solenoid coil 84$^e$ and the lever 84$^f$. This is but one of the thirty-one combinations made possible in my present invention by the use of the five bars 84$^d$ to 88$^d$. When the bar 84$^d$ is shifted, the interposing member 84 is moved in the plane of rotation of the arm 45. If now the solenoid coils 74$^a$ and 74$^b$ become energized, the arm 45 carried by the spindle 35 will rotate in the manner heretofore described against the tension of the spring 65. As the arm 45 moves, it will strike the interposing member 84, carrying this member along the slot 83 until it is stopped by the stop member 80. Obviously, the spindle must cease at this point in its rotation and if the solenoid coils 74$^a$ and 74$^b$ continue in their pull upon the bar 71, which is the case in the normal operation of the device, this further force exerted by the solenoid coils 74$^a$ and 74$^b$ will swing the entire beam and carriage against the tension of the spring S' until the type-wheel strikes the paper and has impressed thereupon a letter, or such legends as may be predetermined.

While the type-wheel is rotating, as by means of the solenoid coils 74$^a$ and 74$^b$, the type thereupon is supplied with a deposit of ink by means of a type inking mechanism most clearly shown in Figure 1, which consists of a pair of ink rollers C carried by a supporting bracket 81 secured to the frame 38 of the carriage 3. A T-shaped member E serves as a means for preventing the rollers C from accidentally falling from their supporting pins C', which pins are securely fixed to the end of the bracket 81. The rollers C are arranged to contact the type as the type-wheel is rotated.

In my present embodiment of the invention there are two rows of characters, one above the other, and each row of characters is spaced at regular intervals upon the periphery of the wheel. The characters on the type-wheel are further so arranged that following the selection of any of the interposing members 84 to 88 between the arm 45 and the stop member 80, the particular character desired to be printed in accordance with this selection of interposing members, will be facing the platen 60 when the action brought about by the solenoid coils 74$^a$ and 74$^b$ is completed.

In Figure 1 I have shown a solenoid coil 120 having a plunger 121, and a plunger rod 122. A pawl 123 is pivotally mounted upon the outer end of the plunger rod 122, as shown at 124. This pawl is arranged to engage a ratchet wheel 125, carried by the shaft 126, upon which the platen 60 is carried. The shaft 126 is rotatably mounted upon the side portions 16 and 16$^a$, and is provided at each end thereof with a knob 126$^a$ by means of which the platen 60 may be manually rotated if desired. A spring (not shown) is provided for normally holding the pawl 123 in engagement with the ratchet wheel 125 so that when the solenoid coil 120 is actuated, the platen 60 will rotate one space rearwardly, that is, to bring paper carried thereupon upwardly for one space. The solenoid coil 120 is mounted upon the U-shaped member 127, which member is carried by the shaft 126, the shaft being free to turn relative to the member 127. The member 127 is provided with a portion arranged to extend exteriorly of the wall 16 through a slot provided therefor, and a spring 130 is connected at one end to the exteriorly extending portion, and at its opposite end to a lug 130$^a$. A member 128, somewhat similar to the member 127, is carried by the shaft 126 adjacent to the opposite end of the platen 60, and is provided with an exteriorly extending portion connected by means of a tension spring 130 to the lug portion 130$^a$ of the side wall 16$^a$. The provision of this particular structure is necessary for normally holding the platen 60 in one of two of its shiftable positions, i. e., the higher of the two positions. It should be noted that where the shaft 126 extends through the side walls 16 and 16$^a$, that it passes through a slot adequate to permit the vertical movement of the platen against the action of the springs 130.

I provide a stop screw 131 and a lock nut 130

132 immediately below the exteriorly extending portion of the member 127, so that the downward movement of the platen 60 may be limited at will, thus assuring the proper alinement of the platen 60 with the lowermost of the rows of type.

Figure 2:
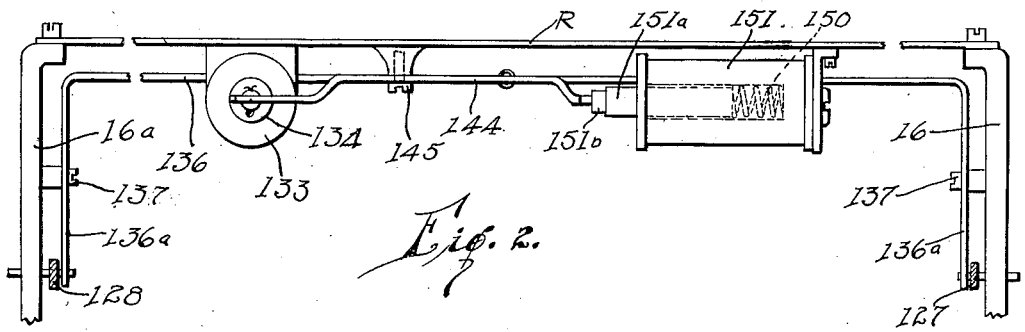
Figure 2 is a top view of the platen mechanism.
Figure 3:
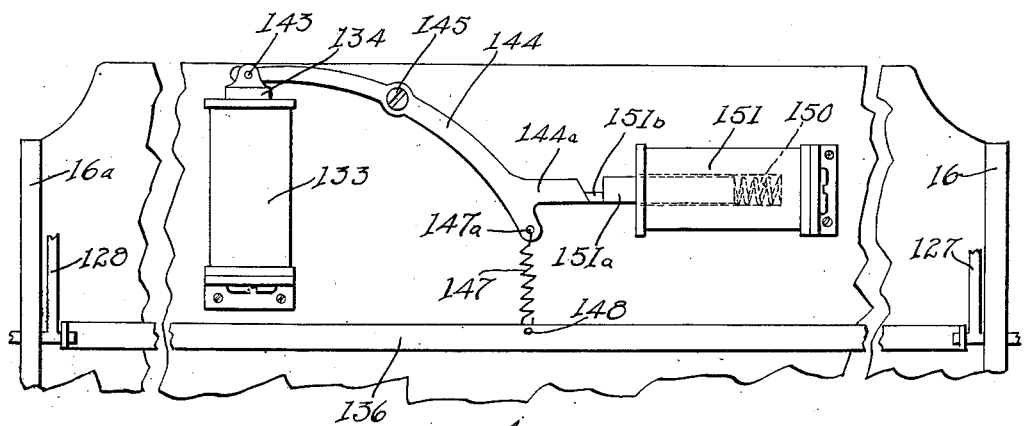
Figure 3 is a side elevation of the mechanism illustrated in Figure 2.

Normally the position of the platen is that shown in Figure 1 and the uppermost of the type rows is in registration therewith. In order to effect the printing of the lower row of type characters, I provide a solenoid coil 133 (see Figures 2 and 3). The solenoid coil 133 is provided with a plunger 134. A lever 144 is pivotally supported at 145 intermediate its length, substantially as shown in Figure 3, to the rear wall of the machine shown at R. The lever 144 is pivotally connected to the plunger 134 at 143. The opposite end of the lever is provided with a hole 147$^a$ therethrough arranged to engage one end of a tension spring 147. The opposite end of the tension spring 147 is connected at 148 to a horizontal U-shaped member 136. The sides 136$^a$ of the U-shaped member are pivotally mounted intermediate their length to the side walls 16 and 16$^a$ of the machine by means of pivot screws 137. I choose to call this U-shaped member a shifter or shifting lever. The remote ends of the shifter lever 136 are connected to integral downwardly extending portions of the members 127 and 128, these latter members being more clearly shown in Figure 1, and heretofore described as connected to the shaft 126 of the platen 60.

It will be evident from the foregoing description that when the solenoid coil 133 is energized, the lever 144 will be drawn downwardly by the plunger 134, thereby occasioning an upward movement of the rear portion of the shifter lever 136, and a downward movement of the members 127 and 128. This movement will be against the action of the springs 130, and the platen 60 will move into registration with the lowermost row of type.

Means for locking the platen in its lowermost position is provided in an electrically controlled locking device comprising a solenoid coil 151 disposed in a plane transverse to the coil 133. The solenoid coil 151 is provided with a plunger 151$^a$, but unlike the coils and plungers heretofore described, a compression spring 150 is disposed between the inner end of the plunger 151$^a$ and the inner end wall of the coil 151 this spring tends to keep the plunger normally with its end projecting out of the coil 151. The plunger 151$^a$ is provided with an end portion 151$^b$, smaller in diameter than the plunger proper and having its end surface beveled, as shown in Figure 3. The lever 144 is provided with an integral portion 144$^a$ having its end surface beveled to correspond with the end surface of the portion 151$^b$, so that the lever 144 may move upwardly past the plunger 151$^a$ against the action of the spring 150, but may not return until the plunger 151$^a$ is drawn into the solenoid coil 151. This structure provides means for locking the lever 144 above the portion 151$^b$, and thereby locking the platen 60 in the lowermost of its shiftable positions. The lever 144 may be instantly released by energizing the coil 151.

The solenoid coil 120 is provided with flexible leads terminating in a suitable terminal block (not shown) so that it is obvious that the rotation of the platen 60 may be accomplished regardless of its position in a vertical plane. It should also be noted at this time that if desired a third row of type may be provided on the type-wheel by the substitution of a double locking and releasing device. This modification I deem within the spirit and scope of my invention.

The particular means for selectively permitting the actuation of the desired combination of the interposing members 84 to 88 inclusive, is provided as follows. An inverted U-shaped casting 160 is secured to the base 16$^b$ of the machine, as shown at 16$^c$ in Figures 1, 6 and 7. The casting 160 is provided with angular upstanding lug portions 161 on either side thereof, upon which a pin 162 is mounted. An insulating strip 163 of fiber or other suitable material, is secured by means of bolts 163$^a$ to the upper portion of the lugs 161.

The pin 162 serves as a pivot for a plurality of levers $X^1$, $X^2$, $X^3$, $X^4$, and $X^5$ spaced apart from one another by washers or collars 164. These levers I choose to call function or selector levers, the exact purpose of which will be hereinafter described. The forward ends of these selector levers are provided with depending angular portions, each of which is provided with slots or rabbeted portions, substantially as shown in Figure 8, and are arranged to exactly overlie the five longitudinal bars 84$^d$ to 88$^d$. Each of the bars 84$^d$ to 88$^d$ is so arranged that all five extended portions are brought into a substantially horizontal plane when these bars are not in operation. This is clearly shown in Figures 7 and 8.

At the opposite ends of the selective levers $X^1$ to $X^5$ inclusive, are contact plates C insulated from the body of the levers by insulating members 167 and bound thereto by a bolt 168. The rearward portions of the selector levers are twisted from a vertical plane to a horizontal plane, as indicated at 168$^a$. The purpose of this is to have all of the contact plates C lying in a substantially horizontal plane.

A fiber terminal or contact supporting board 169 is secured to the rearward portion of the casting 160 in the manner shown in Figure 7. This terminal board is of fiber or other insulated material and is provided with a longitudinal slot 169ª therethrough, through which the contact plates C are free to oscillate in a vertical plane. Each of the contact plates or tongues are provided with silver contact tips, and each tongue or plate is provided with an associate contact screw 170 and 171 on either side thereof. The flexible connection for the tongues or plates C is provided by a flexible conductor 174 connected at one end with the tongue and at the opposite end with the terminal post 180 (see Figure 6). Electrical connection to the contact posts 170 and 171 is provided by metal lug portions 175 for each of the contact posts to which suitable connecting wires may be soldered. A tension spring 177 is provided for each of the selector levers $X^1$ to $X^5$ inclusive and is connected at one end to the respective levers and at the opposite end to an outwardly extending portion 177ª of the casting 160. The tendency of the springs 177 is also to maintain the contact plate C in contact with the contact post 170.

The means for actuating, at the proper time, the plate 106 to occasion the release of the levers 84$^d$ to 88$^d$ inclusive, is provided in the following mechanism illustrated in Figure 15. This figure is an enlarged fragmentary view of the left end elevation of the device, as shown in Figure 1, and the lever 8 heretofore described, upon which the contact 10 is carried, may be clearly seen, as well as the annular end portion of the beam 1. A cam member 185 is fixed by means of a set screw 185ª to the beam 1. The cam 185 is provided with a pair of integral projections thereupon, the projection 186 forming a radial projection, and the projection 187 forming a tangent projection. A lever 188 is pivotally mounted at 189 to the side wall 16ª. An insulated contact member 190 is carried by the lever 188. The contact 190 may be shifted longitudinally to occasion the proper adjustment thereof. A stationary contact 192 is also insulated and supported upon the wall 16ª so that movement of the lever 188 will cause the contact 190 to contact therewith. A tension spring 193 is secured at one end to the lever 188 intermediate the pivotal point 189 and the contact point 190, and at its opposite end to a lug 194 forming an integral part of the wall member 16ª. A solenoid coil 195 is mounted upon the wall 16ª in approximate horizontal alinement with the lever 188. The coil 195 is provided with an associate plunger 196 and a compression spring 199, substantially the same as the coil 151 and the spring 150 heretofore described. A rod 197 is carried by the plunger 196, the outer end of the rod 197 being normally in the path of an outwardly extending integral portion 198 of the lever 188. When the coil 195 is energized, the plunger 196 will draw the rod 197 out of the path of the portion 198. A stop member 200 is provided for limiting the outward movement of the plunger 196.

A relatively long lever 201 is pivotally mounted at 202 upon the wall 16ª. The lever 201 has an arcuate depending portion terminating at a point adjacent to the base of the machine and toward the rear thereof. The extremity of this arcuate portion 203 terminates in a claw-shaped member in which the end of a lever 204 is constantly engaged so that movement of the lever 201 will occasion movement of the lever 204. A slot 205 through the side wall 16ª permits the extension of the lever 204 therethrough. The opposite end of the lever 204 is connected to the plate 106, as indicated at 204ª in Figure 10. The lever 201 is normally held so that the bar 204 is at the bottom of the slot 205 by means of a tension spring 207 secured at one end on the lever at 207ª and at its opposite end to an upstanding lug 207$^b$ of the side wall 16ª.

The lever 201 is provided with an outwardly extending lug portion 208 having a hole therethrough, through which one end of a rod 209 is loosely projected. The upper end of the rod 209 is provided with an enlarged head portion 209ª so that the rod may not be drawn through the lug 208. The lower end of the rod 209 is connected to a plunger 215ª. The plunger 215ª is associated with a solenoid coil 215, and a spring 216 is provided for normally holding the plunger 215ª in an elevated position. This structure is the same as described in the solenoid coil 151 and the spring 150.

At the uppermost end of the lever 201 is a second upstanding lug 210ª, upon which an adjustable screw 210 is supported. The lever 188 is provided at its foremost end with a similar structure, i. e., the adjustable screw 188ª. At 211 a relatively short lever is pivoted intermediate its length at 211ª to the wall 16ª. The forward end, i. e., the right hand end of the lever normally rests against the lower end of the outwardly extending portion 208. A rod 212 is pivotally mounted in an elongated slot 212ª in the lever 211, substantially as shown in Figure 15. The rod 212 carries adjacent its upper end a collar 213, the collar being secured by a transverse pin 213ª against movement relative to the rod 212. The upper end of the rod 212 is arranged to project loosely through a hole in an outwardly extending portion 214 on the lever 188.

The solenoid coil 215 is provided with two separate windings, while all of the solenoid coils heretofore described are provided with but one winding. The purpose of this additional winding, as shown in Figure 16, will be hereinafter described.

From the foregoing description of the various parts of the device, the operation thereof may be readily understood. In Figure 16 I have shown a diagram of the electrical connections used in working out my invention. The wiring diagram, as shown in Figure 16 terminates in six terminal lines numbered 220 to 225 inclusive and five ground connections. The ground connections may be the body of the device provided the device is grounded in a suitable manner. If my device is intended for use in line or radio telegraphy, these terminals 220 to 225 are connected to segments of a commutator over which rotates a brush connected to the line or to the contacts of a relay line, which in turn is operated by impulses sent over the line or by radio. At the opposite end there would be a somewhat similar commutator, and a brush rotating in synchronism with the brush at the receiver, so that current applied to the various commutator segments at the transmitter could be picked up by corresponding segments at the receiver, which in turn would operate corresponding coils $84^e$ to $88^e$ and 195. The operation of these coils control the various operations or functions of my device.

There are a great many ways by which I may obtain a selective control of the coils $84^e$ to $88^e$ and 195 to operate the device, either by line telegraphy or by radio telegraphy, and I choose to employ any of the devices commonly known in the art for accomplishing this selective control. It is therefore thought that a detailed description and showing of the selector means, i. e., the means by which impulses may be transmitted through certain wires 220 to 225 inclusive and the ground may be brought about, is unnecessary.

With reference to Figures 6, 7 and 8 it will be obvious that when two or more of the bars $84^d$ to $88^d$ are shifted by their associate coils $84^e$ to $88^e$ in the manner heretofore described, that all five of the selector levers $X^1$ to $X^5$ will be shifted. This will bring all of the contact tongues C against the contact members 171. It is also obvious that when current is supplied through the wire 225 to the ground G following the energizing of the coils $84^e$ to $88^e$ inclusive, that the battery or current will energize the solenoid coil 195 and draw the plunger 196 inwardly against the action of the spring 199. This will release the lever 188, and the spring 193 will cause the lever 188 to move, closing the contacts 190—192. With reference to Figure 16 the circuit can now be traced as follows. Current from the battery B will flow through a conductor 230, through the contacts 190—192, the line 231, through the solenoid coil 11, the operation of which has been explained, i. e., the advancing of the carriage one step, through the conducting wire 232, through the solenoid coils $74^b$ and $74^a$, through the conductor 233, and since all of the tongues C are contacting the members 171, the circuit will terminate at ground $G^2$. In the manner previously described, during the flow of current through the foregoing circuit, the type wheel will be rotated to a degree in accordance with the particular combination of the coils $84^e$ to $88^e$ energized, and the carriage will subsequently be swung forward, causing the type to strike the platen 60.

When the type-wheel 43 is immediately adjacent the platen 60, the cam 185, which turns therewith, will move so that the projection 187 will engage the screw $188^a$ and move the lever 188. This will occasion the breaking of the contacts 190—192, thus disconnecting the current from the battery B from the various solenoid coils. Simultaneously, the arm 186 of the cam 185 will actuate the lever 201, which in turn will elevate the lever 204 fastened at $204^a$ to the plate 106 (see Figure 10), causing the plate 106 to swing rearwardly and disengage the levers $84^f$ to $88^f$ which have been locked by the locking mechanism heretofore described when their associate solenoid coils $84^e$ to $88^e$ were energized.

The device is now ready for the next combination of transmitted impulses. The foregoing operation has occasioned one letter or character to be impressed upon paper held on the platen 60.

It should be understood that when more than one of the coils $84^e$ to $88^e$ have been energized by the energizing of corresponding circuits 220 to 224 that all five of the levers $X^1$ to $X^5$ are shifted. However, different interposing members will be shifted in accordance with each particular combination, so that different degrees of rotation of the typewheel may be obtained. It is also obvious that no matter what combination of the five circuits may be energized, that the sixth, i. e., that circuit terminating in the circuit 225 and including the coil, must follow in order to operate the device.

Let us assume that we have transmitted a number of letters and that we want to space the word. The prearranged signal for this combination will therefore be sent at the transmitter, and such an impulse will operate the coil $88^e$, followed by an impulse through the circuit 225. After the solenoid coil 195 has been energized by the latter impulse, the current may be traced as follows: From $G'$ through the battery B as before, through the conductor 230, the contacts 190—192, the conductor 231, the coil 11, the conductor 232, through the conductor 237, instead of the solenoid coils $74^a$ and $74^b$ (this is because the selector lever $X^1$ remains elevated, while the others are moved against the action of their respective springs 177).

In passing through the conductor 237, the current will pass through the lowermost of the windings of the solenoid coil 215, indicated at 215$^a$, and thence to G$^2$, which of course is connected to the ground G$^1$. When the solenoid coil 215 is energized, the rod 209 will be drawn downwardly and thus cause the collar 213 on the rod 212 to engage the lug 214 of the lever 188, and move that lever, thus breaking the contact 190—192. This operation is brought about whenever it is necessary to operate the carriage without moving the type-wheel. The movement of the lever 201 occasioned by the rod 209, will also actuate the lever 204 to release any of the L-shaped levers 84$^f$ to 88$^f$ locked by a previous combination of impulses in the manner heretofore described.

It should be noted that when the lever 188 is operated either by the cam 185 in the case where a character is to be impressed on the paper held on the platen, or by the coil 215, when other functions are desired, that the rod 197, by means of the action of the spring 199, will return under the projection 198, thus holding the contacts 190—192 open until the coil 195 is again operated.

Let us assume now that we have received a complete word by the transmitting device followed by a word space, and that we want to bring the carriage back to the beginning of the line. For this function an impulse would be received in circuit 220, followed by an impulse in the circuit 225. The selector levers X$^1$, X$^3$, X$^4$, and X$^5$ would be moved so that their respective tongues would be against their lower contacts, but X$^2$ would remain in its upper position contacting the contact 170, and the circuit will be traced as follows: From G$^1$ through the battery to the conductor 230, the contacts 190—192, through 240, through the uppermost winding 215$^b$ of the solenoid coil 215, through the conductor 241, through the winding A of a relay 275, through the conductor 242 to contact 170 of the selector lever X$^2$, and through the tongues and lower contacts of the selector levers X$^3$, X$^4$, and X$^5$ to G$^2$. Since the solenoid coil 215 has been operated by the source of current through this circuit, the circuit would be broken by the action of the rod 209 upon the lever 188, as heretofore described. However, the relay 275 has been operated and its contacts 243 closed. A separate circuit independent of the function contacts, will now be energized and may be traced as follows: From G$^1$ through the battery B, the conductor 244, through the winding B and the relay 275 (which will serve to continue to hold the contacts 243 closed), through the contacts 243, the conductor 245, the contacts 10$'$ and 10, through the conductor 246, and finally through the solenoid coil 26 to the ground G$^3$. As the solenoid coil 26 is energized, the lever 21 will be operated to release the pawls 17 and 19 from the ratchet bar 2 and the carriage will be returned to its starting position on the beam 1 by means of the spring 28 and the cord 31. The device is now ready for the starting of a new line. As the carriage 3 arrives at the left end of the beam 1, the rod 5 will be forced outwardly against the action of the spring 6, and the contacts 10 and 10$'$ will be mechanically broken. This will break the circuit and the relay 275 will become dead, the spring 247 separating the contacts 243.

Let us assume now that the distant operator, whoever he may be, now wishes to shift the platen in order to print figures or other characters on the upper row of type. The impulse for the shifting of the platen would be from the line 223, followed by an impulse to the terminal 225. The circuit would be traced as follows: G$^1$ through the battery B, through the conductor 230, through contacts 190—192, through the conductor 240, through the winding 215$^b$ of the solenoid coil 215, through the conductor 241, through the solenoid coil 133, through the conductor 256, through the upper contact 170, associated with the selector lever X$^3$, and from thence through the contacts C and the contacts 171 of the selector levers X$^4$ and X$^5$ to G$^2$. When the current passes through the coil 133, the platen will be shifted in the manner heretofore described, by means of the lever 144, and the members 127 and 128. The solenoid coil 215 will restore all operated parts, including the selector levers X$^1$, X$^2$, X$^4$ and X$^5$, which have been shifted during the last operation, to their normal positions.

To release the platen 60 from its shifted position, an impulse must be sent through the terminal 221, followed, of course, by an impulse through the terminal 225. The circuit would then be traced as follows: G$^1$ through the battery B, through the conductor 230, through contacts 190—192, through the conductor 240, through the winding 215$^b$ of the solenoid coil 215, through the conductor 241, through the solenoid coil 151, through the upper contact and the tongue C associated with the lever X$^4$ (since said tongue remains elevated) and thence through the lower contact and the tongue C associated with lever X$^5$ to G$^2$. Upon passing through the solenoid coil 151, the platen will be released precisely in the manner heretofore described. Simultaneously, the current will energize the magnet 215, will subsequently restore all of the operated parts to normal, and will separate the contacts 190—192. As in the case of any function operation where magnet 215 is energized, the operation brought about by said magnet in restoring the operated parts, as well as the contacts 190—192, to normal, will not be brought about until the plunger of magnet 215 has travelled sufficiently inwardly to cause the head portion 209$^a$ to engage with the lug 208. This will allow a sufficient duration of current in the magnet coil that becomes energized at the same time as 215, so that said magnet will perform its proper function.

To rotate the platen, as in the spacing of lines one from another, the impulse will be given upon the line 222, followed, of course, by an impulse in line 225. After magnet 84$^e$ has been operated by the first impulse, and magnet 195 by the second, the course of current will then be as follows: G$^1$, through the battery B, conductor 230, contacts 190—192, conductor 240, the winding 215$^b$, conductor 241, through the magnet coil 120, conductor 259, through the upper contact and the tongue C associated with the lever X$^5$ (since this lever now remains elevated) and thence to G$^2$.

The current when passing through the winding 215$^b$ of the solenoid coil 215, will release and open the contacts 190—192 and restore all the operated parts to normal in the manner heretofore described.

In aiding to secure extreme accuracy coupled with rapidity in the operation of my invention, I provide springs 105 chiefly for the following reason: If the bar 84$^d$ (I am using this one of the five employed in my mechanism as an example) and associate member 84$^f$ had been rigidly pivoted at P$^1$, instead of rotatably pivoted as I have it, it would be obvious that a comparatively short duration of current through the coil 84$^c$ would, due to the combined inertia of all the movable parts associated with 84$^d$, possibly not be long enough to allow the outer extremity O to be pulled sufficiently low in the slot to become locked by the pawl 84$^g$. My arrangement, however, overcomes such a possibility in functioning as follows: When the magnet is energized, the duration of current through its windings may be very brief indeed, as its plunger will immediately pull down associate member 84$^f$ (at the same time stretching the spring 105) so that the member 84$^f$ will become locked by the pawl 84$^g$. Almost instantaneously following this (even if the current has already ceased in the coil 84$^e$) the bar 84$^d$, and all the other movable parts associated therewith, will become fully shifted by the spring 105.

Figure 17 is an end view of the platen, showing a portion of the paper sustaining mechanism. Note in Figure 1, in the upper right hand corner, I have shown a broken line (the lower half of which is on the coil 120) with arrows, to show the direction of view of Figure 17.

Associated with the members 127 and 128 (see Figure 1) are approximately horizontal bearing members 191, one for each member 127 and 128 respectively. These bearing members support two rollers R, similar to the platen rollers commonly used in ordinary typewriting machines. A vertical slot 192$^a$ is provided in the members 127 and 128, through which a pin or lug 190$^b$ attached to the members 191, passes. A spring 190, attached at one end to a lug 190$^a$, and at its opposite end to the lug 190$^b$, serves as means for keeping the rollers in contact with the platen, or the paper inserted therebetween. At 192 are two rods, both which connect the members 191 associated with the members 127 and 128 respectively, and which serve as a support for the bent plate 193. The plate 193 is secured to rods 192, being bent around them as shown by the dotted lines. Attached to the rear ends of the members 191 is a plate 194, fastened at bent portions (portions because there is one at each end) 194$^a$ thereof by screws 195. At the forward ends of the members 191 are the paper guides 196, secured at bent angular portions 196$^a$ thereof, by screws 197. Screws 195 and 197 screw to threaded holes in the members 191.

Plates 194 and 193 as well as the guides 196, serve as means for guiding the paper in its travel around the platen. Guides 196 only extend a comparatively short distance from the ends of the platen, and it is impossible for the type-wheel to strike them.

I claim:

1. In a device of the character described, a carriage, a spindle rotatably mounted on said carriage, a type-wheel carried by said spindle, a radially extending arm carried by said spindle, a gear on said spindle, an arm pivotally mounted on said carriage and having a gear portion in mesh with said gear on said spindle, electrically operated means for moving said pivotal arm, whereby said spindle may rotate, a stop member adapted to limit the movement of said radial arm and therefore said spindle, and means for selectively interposing members of different widths between said radial arm and said stop, whereby said type-wheel may stop in any one of a plurality of predetermined positions.

2. In a device of the character described, a carriage, a spindle rotatably mounted on said carriage, a type-wheel carried by said spindle, a radially extending arm carried by said spindle, a gear on said spindle, an arm pivotally mounted on said carriage and having a gear portion in mesh with said gear on said spindle, electrically operated means for moving said radial arm, whereby said spindle may rotate, a stop member adapted to limit the movement of said radial arm and therefore said spindle, a plurality of interposing members of different widths, means for moving said members selectively or in combination into the path of said radial arm, whereby said arm may move said members against said stop, and said type-wheel may stop in any one of a plurality of predetermined positions.

3. In a device of the character described, a rotatably mounted type wheel, a platen for said type wheel, an inking mechanism for said type wheel, a carriage for said type wheel arranged for movement longitudinally of said platen, and a type selecting mechanism for actuating said type wheel carried by said carriage and moving laterally therewith.

4. In a device of the character described, a rotatably mounted type wheel, a platen for said type wheel, associate inking mechanism for said type wheel, a carriage arranged for longitudinal movement of said platen and for rotatably supporting said type wheel, and a type selecting unit for actuating said type wheel moving with and supported by said carriage.

5. In a device of the character described, a platen, a carriage arranged for longitudinal movement relative to said platen, a type wheel rotatably mounted on said carriage, an inking mechanism for said type wheel, a type selecting unit for operating said type wheel moving with and supported upon said carriage, and stationary means for operating the mechanism of said type selecting unit.

6. In a device of the character described, a platen, a carriage arranged for longitudinal movement relative to said platen, a type wheel rotatably mounted on said carriage, inking mechanism for said type wheel, a type selecting unit moving with and supported by said carriage, and means arranged for selectively operating the mechanism of said type selecting unit for any lateral position of said carriage.

7. In a device of the type described, a platen, a carriage arranged for longitudinal movement relative to said platen, a type wheel rotatably mounted upon said carriage, inking mechanism for said type wheel, a type selecting unit for operating said type wheel mounted upon and moving with said carriage, said unit comprising a plurality of selectively operated members, the instrumentality of which determines the degree of rotation of said type wheel, and each of said members being substantially one dimension different than the corresponding dimension of the other members.

8. In a device of the character described, a platen, a carriage arranged for longitudinal movement relative to said platen, a type wheel rotatably mounted upon said carriage, inking mechanism for said type wheel, a type selecting unit moving with and supported by said carriage for operating said type wheel, said unit comprising a plurality of selectively operated members, the instrumentality of which determines the degree of rotation of said type wheel, each of said members having substantially one dimension different than the corresponding dimension of the other members, and an arm rotating with said type wheel cooperating with said members.

9. In a device of the character described, a platen, a carriage arranged for longitudinal movement relative to said platen, a type wheel rotatably mounted on said carriage, an inking mechanism for said type wheel, a type selecting unit moving with and supported by said carriage for operating said type wheel, said unit comprising a plurality of selectively operated members, the instrumentality of which determines the degree of rotation for said type wheel, each of said members having substantially one dimension different than the corresponding dimension of the other members, and an arm rotating with said type wheel for yieldably rotating said members.

10. In a device of the character described, a platen, a carriage arranged for longitudinal movement relative to said platen, a type wheel rotatably mounted on said carriage, an inking mechanism for said type wheel, a type selecting unit moving with and supported by said carriage for operating said type wheel, said unit comprising a plurality of selectively operated members, the instrumentality of which determines the degree of rotation for said type wheel, each of said members having substantially one dimension different than the corresponding dimension of the other members, an arm rotating with said type wheel for yieldably rotating said members, and a stop for arresting the rotation of said members and consequently said arm, thus causing said type wheel to stop.

11. In a device of the character described, a platen, a carriage arranged for longitudinal movement relative to said platen, a type wheel rotatably mounted upon said carriage, a type selecting unit moving with and supported by said carriage for operating said type wheel, said unit comprising a plurality of selectively operated members the instrumentality of which determines the degree of rotation of said type wheel, each of said members having at least one dimension different than the corresponding dimensions of the other members, a stop, an arm carried by said type wheel and extending radially therefrom, arranged to engage with said members to yieldably rotate said members, means for rotating said arm and said type wheel until arrested by said stop, and means for subsequently engaging the selected type of said type wheel with said platen.

12. In a device of the type described, a platen, a carriage arranged for longitudinal movement relative to said platen, a type wheel rotatably mounted upon said carriage, a type selecting unit moving with and supported by said carriage for operating said type wheel, said unit comprising a plurality of selectively operated members the instrumentality of which determines the degree of rotation of said type wheel, each of said members having at least one dimension different than the corresponding dimensions of the other members, a stop, an arm carried by said type wheel and extending radially therefrom, arranged to engage with said members to yieldably rotate said members, means for rotating said arm and said type wheel until arrested by said stop, means for subsequently engaging the selected type of said type wheel with said platen, and stationary means for controlling the interposing of said members between said arm and said stop.

13. In a device of the character described, a platen for sustaining the substance to be impressed, a carriage, a rotatably mounted type carrier therefor a type selecting unit moving longitudinally with said type carrier, said unit comprising a plurality of selectively operated members the instrumentality of which determines the selected type character, each of said members having at least one dimension different than the corresponding dimension of the other members.

14. In a device of the character described, sustaining means for the form to be impressed, a carriage and a rotatably mounted type carrier therefor, a plurality of permutation devices arranged for longitudinal movement with said type carrier, each of said permutation devices having substantially one dimension different than the corresponding dimension of the other permutation devices.

15. In a device of the character described, means for sustaining the form to be impressed, a rotatably mounted type carrier arranged for transverse movement relative to said form, selectively controlled permutation means movable with said type carrier and electro-responsive members for controlling the operation of said permutation means during transverse progression of said type carrier.

16. In a device of the character described, means for carrying a plurality of type characters, an aggregate motion mechanism for selecting predetermined type characters by the shifting of predetermined permutations of the components of said aggregate motion mechanism from one to another position, means for shifting the selected type character into printing position and whereby said shifting will also shift said components.

17. In a device of the character described, a rotatably mounted type carrier, an associate aggregate motion mechanism for selecting predetermined type characters thereon by the shifting of predetermined permutations of the components of said aggregate mechanism from one to another position, means for shifting the selected type character into printing position whereby said shifting will also shift said components, said means comprising an index member common to all of said type characters.

18. In a device of the character described, a type carrier, an aggregate motion mechanism for selecting type characters of said type carrier by shifting predetermined combinations of the components of said aggregate motion mechanism from one to another position, said components comprising a plurality of coaxially disposed permutational devices, electro-responsive means for selectively shifting said devices and a common rotator for subsequently rotating only the selected permutational devices.

19. In a device of the character described, a rotatably mounted type carrier, an aggregate motion selective mechanism therefor comprising a plurality of permutational devices electro-responsively selectable by line current signals, and means common to said type carrier and permutational devices for effecting the rotation thereof and for subsequently engaging the selected type character with the substance to be impressed.

20. In a device of the character described, a rotatably mounted type carrier, an aggregate motion mechanism therefor comprising a plurality of permutational devices electro-responsively selectable by line current signals, means common to said type carrier and permutational devices for effecting the rotation thereof for subsequently engaging the selected type character with the substance to be impressed and for restoring the actuated permutational devices to normal positions.

21. In a device of the character described, a plurality of type characters, electro-responsive permutation means for selecting desired type characters, said means comprising a plurality of components each of which, in ascending order, is given twice as large a width assignment as the preceding component, and a common stopping member for said components.

22. In a device of the character described, a plurality of type characters, electro-responsive permutation means for selecting desired type characters, said means comprising a plurality of components which are given width assignments of 16, 8, 4, 2, and 1 respectively, a common rotator and a common arrestor for said components.

IRVING NACHUMSOHN.